(12) United States Patent
Oakley et al.

(10) Patent No.: US 9,291,695 B2
(45) Date of Patent: Mar. 22, 2016

(54) REAL-TIME RF SIGNAL VISUALIZATION DEVICE

(71) Applicant: Fluke Corporation, Everett, WA (US)

(72) Inventors: Peter Q. Oakley, Langley, WA (US); John Paul Hittel, Phoenix, AZ (US)

(73) Assignee: Fluke Corporation, Everett, WA (US)

( * ) Notice: Subject to any disclaimer, the term of this patent is extended or adjusted under 35 U.S.C. 154(b) by 652 days.

(21) Appl. No.: 13/717,250

(22) Filed: Dec. 17, 2012

(65) Prior Publication Data

US 2014/0036065 A1  Feb. 6, 2014

Related U.S. Application Data (60) Provisional application No. 61/680,216, filed on Aug. 6, 2012.

(51) Int. Cl.
*G01S 3/04* (2006.01)
*G01S 3/46* (2006.01)

(52) U.S. Cl.
CPC .. *G01S 3/046* (2013.01); *G01S 3/46* (2013.01)

(58) Field of Classification Search
CPC .................................. G01S 3/046; G01S 3/46
See application file for complete search history.

(56) References Cited

U.S. PATENT DOCUMENTS

| | | | |
|---|---|---|---|
| 2005/0270234 A1* | 12/2005 | Wolf | A63B 29/021 342/443 |
| 2006/0216011 A1* | 9/2006 | Godehn | G01S 3/046 396/58 |
| 2007/0257985 A1* | 11/2007 | Estevez | G06K 9/00369 348/143 |
| 2009/0268030 A1* | 10/2009 | Markham | G01S 3/54 348/158 |
| 2013/0016011 A1* | 1/2013 | Harriman | H01Q 3/04 342/372 |

FOREIGN PATENT DOCUMENTS

| JP | 2005024439 A | 1/2005 |
|---|---|---|
| JP | 2006242871 A | 9/2006 |
| JP | 2007019828 A | 1/2007 |
| JP | 2011022117 A | 2/2011 |
| JP | 2012047473 A | 3/2012 |

OTHER PUBLICATIONS

Extended European Search Report for Application No. EP13178982. 8, dated Jul. 22, 2014.

* cited by examiner

*Primary Examiner* — Huy T Nguyen
(74) *Attorney, Agent, or Firm* — Locke Lord LLP; Scott D. Wofsy; Christopher J. Capelli (57) ABSTRACT

A device provides location information to assist in identifying the location of RF sources. Antenna arrays coupled to corresponding receivers supply signals to a direction of arrival computation block, and the direction information is used to provide a display showing the location of the RF source.

20 Claims, 7 Drawing Sheets

FIG. 7

REAL-TIME RF SIGNAL VISUALIZATION DEVICE

CROSS-REFERENCE TO RELATED APPLICATIONS

This application claims priority from U.S. provisional patent application 61/680,216, filed Aug. 6, 2012, entitled REAL-TIME RF SIGNAL VISUALIZATION DEVICE

BACKGROUND OF THE INVENTION

This invention relates to location of RF sources, and more particularly to an instrument for displaying locations of RF on a scene.

In a variety of situations, it can be desirable to determine the location of an RF source, and provide a display of that location. This location information can be helpful, for example, in troubleshooting installations of wireless devices wireless local area network (WLAN) computer communication devices, locating cellular phone sources, Bluetooth sources, to name a few.

It would be helpful to have a device that would be easy to use and provide real time location information for these and other RF sources.

SUMMARY OF THE INVENTION

In accordance with the disclosure, a system and method provide an electronically read antenna array, receivers, processing hardware and software, and captures and shows a video or still picture with signal sources labeled in their location positions on the video or picture. The system may be portable or fixed mount. The display may be on the device, or located remotely.

Accordingly, the present disclosure provides an improved system and method for locating RF sources and providing a display with the source location indicated thereon.

The subject matter of the present technology is particularly pointed out and distinctly claimed in the concluding portion of this specification. However, both the organization and method of operation, together with further embodiments thereof, may best be understood by reference to the following description taken in connection with accompanying drawings wherein like reference characters refer to like elements.

DETAILED DESCRIPTION

The system according to an embodiment of the present disclosure comprises an antenna array with coordinated receivers, to receive RF signals from one or more RF sources. The incoming signals from the antenna array are processed to determine the location of the RF sources, and location information is displayed. The system may be provided as a hand held or portable device with display for showing the location of the sources on a visible scene.

Figure 1A:
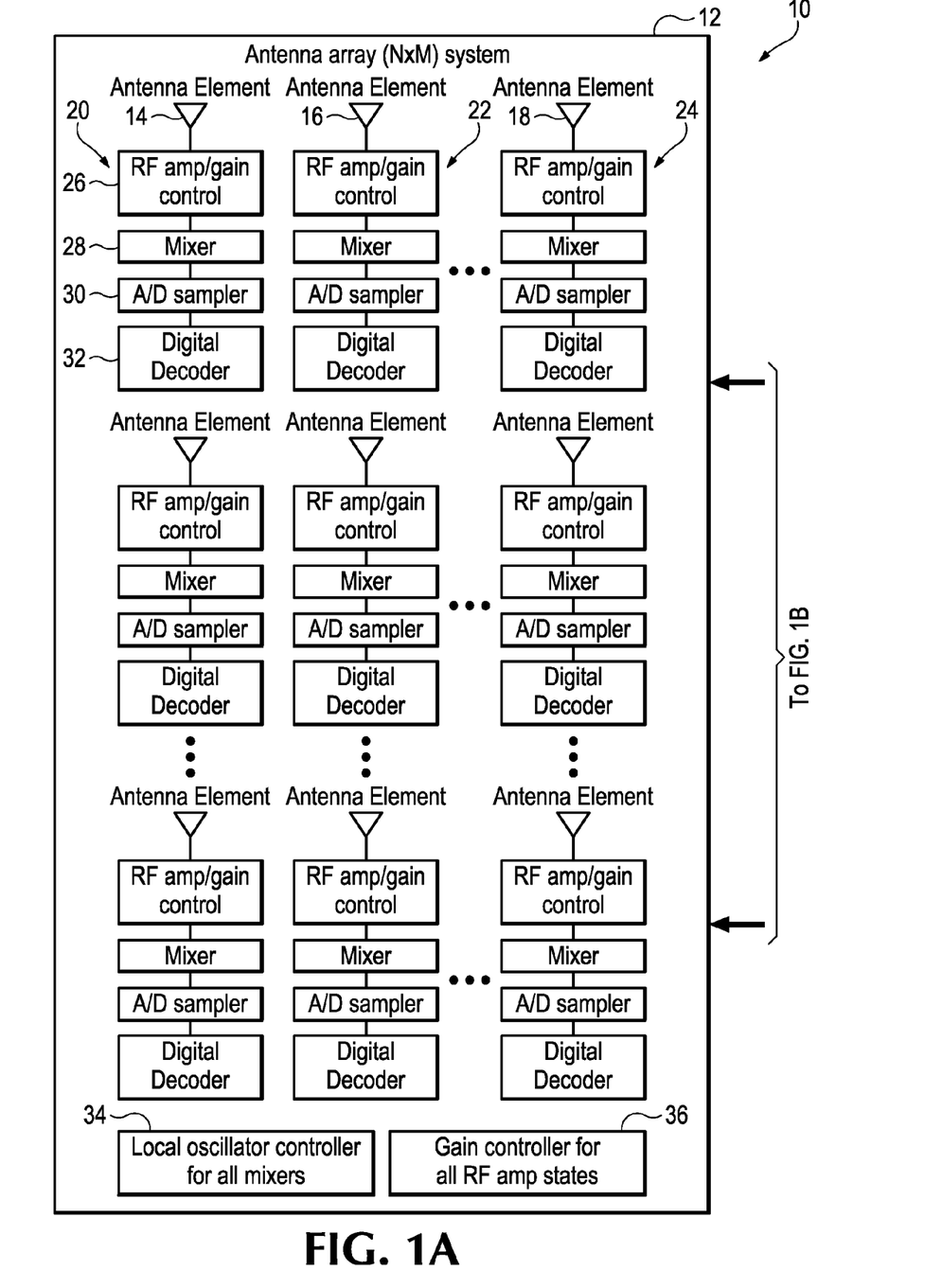
FIGS. 1A and 1B comprise a block diagram of a device in accordance with the present disclosure.
Figure 1B:
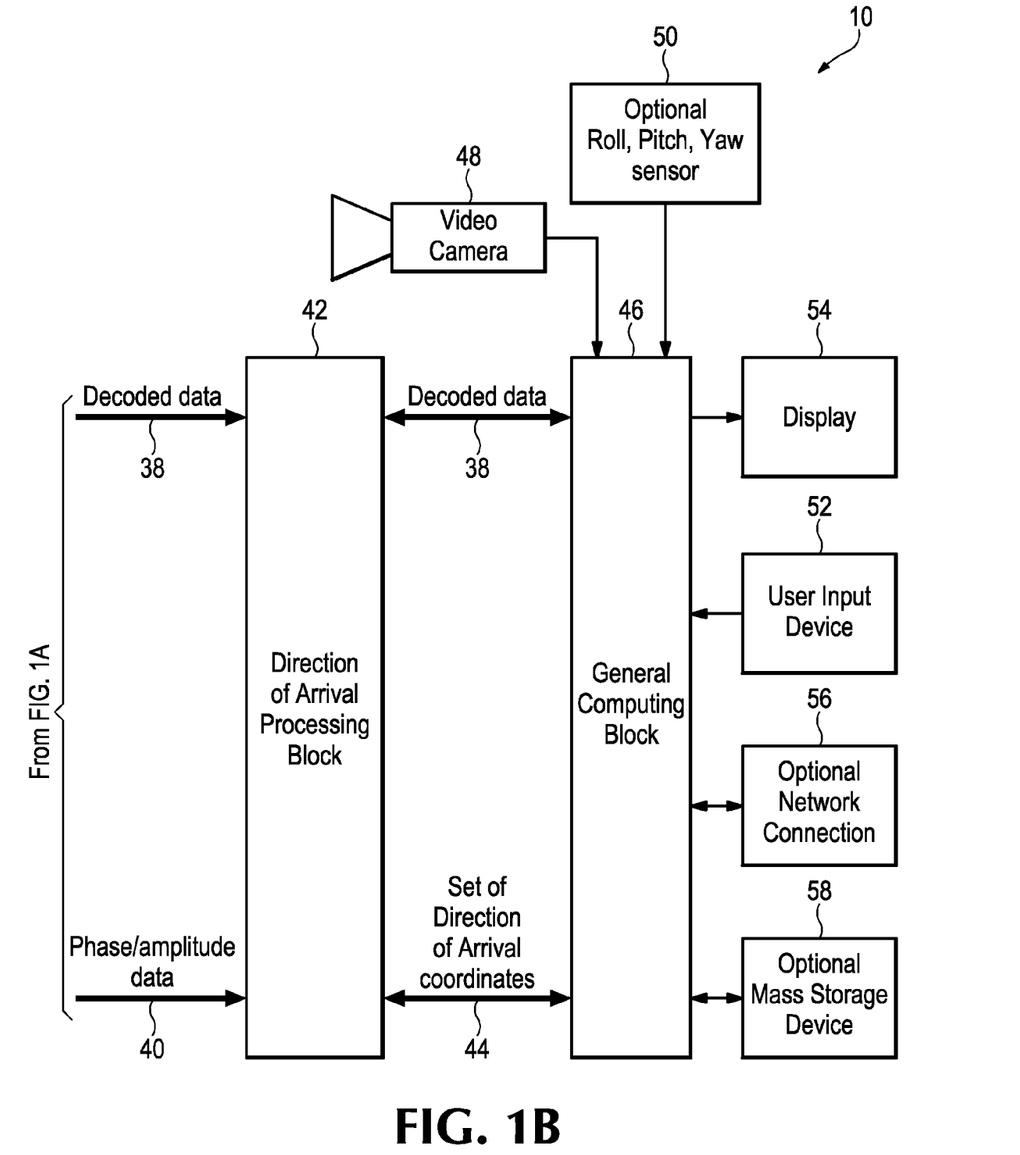

Referring to FIGS. 1A and 1B, a block diagram of a real-time RF signal visualization device 10, the device is suitably provided as a hand held instrument comprising a signal receiving section 12 which includes plural antennas 14, 16, 18, etc. in an N by M array, each antenna associated with a corresponding receiver 20, 22, 24, etc. The receivers each comprise, for example, RF amplifier and gain control 26, mixer 28, A/D sampler 30 and digital decoder 32. Receiving section 12 further includes a local oscillator 34 providing signals to the mixers of the receivers, and a gain controller 36 to control the RF amplifier stages of the receivers.

The receiver block 12 provides decoded data 38 and phase/amplitude data 40 from the various receivers to a direction of arrival processing block 42, which further supplies decoded data 38 and a set of direction of arrival coordinates 44 to a general computing block 46.

The general computing block receives further input from video camera 48, roll/pitch/yaw sensor 50 and/or other position/location sensors, and user input device 52, while providing output to display 54, and communicates with network connection 56 and mass storage device 58.

In operation, the antenna elements and receivers detect and decode RF signals and provide the decoded data and phase/amplitude data to the direction of arrival processing block, which determines the direction or directions from which a particular RF signal was arriving (reflections may result in multiple directions), providing the direction of arrival coordinates to the general computing block. These coordinates comprise, for example, azimuth and elevation angle with respect to the center line of antenna array.

While the receiving section is detecting the RF signals, the video camera 48 is providing a view of the 'observation direction' of the device, and the general computing block correlates that view of the video camera with the direction of arrival information, and provides to the display 54, a view of the observed scene with indicators showing the location in the field of view of the video camera that the RF source or sources are transmitting from, using the azimuth and elevation information to locate the RF source relative to the center line of the camera view. If the RF source includes identifying information in its transmitted signal, some or all of the identifying information can be further provided on the display.

The roll/pitch/yaw sensor provides input to sense movement of the device, so that as the view provided by the video camera changes, the indications of the RF source locations may be moved in the display to track their visual location with the movement of the device, since the location and direction of view of the device are known as well as the determined location information for the RF source.

With the network connection and mass storage device, data can be saved and transmitted/received to document the observations.

Figure 2:
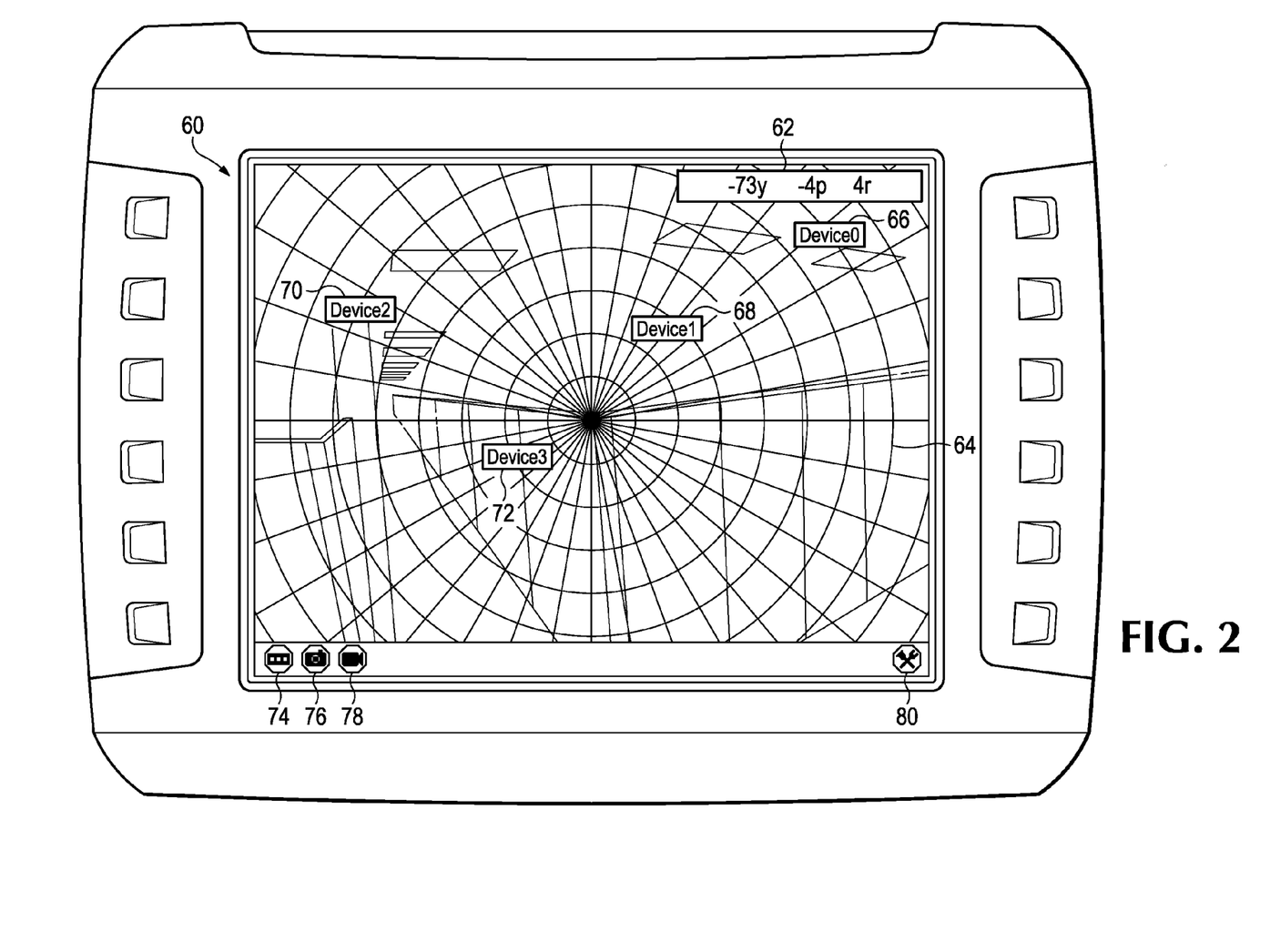
FIG. 2 is an exemplary view of displayed data provided by the device.

FIG. 2 illustrates an exemplary view that would be provided on display for a case where wireless local area network signals in an office are being located. In the view of FIG. 2, a display frame 60 carried by a hand-held case provides a real-time view of the office as seen by video camera 48, with the yaw, pitch and roll coordinates 62 of the device illustrated in the upper right corner as an optionally displayed parameter. A grid pattern 64 may be imposed on the view if desired. Four wireless local area network sources are detected in the illustration, Device0, Device1, Device2 and Device3 at 66, 68, 70 and 72. From this display, the user learns, for example, that Device0, Device1 and Device2 appear to be positioned in the ceiling, above the ceiling panels, while Device3 is apparently located in an office cubicle. The displayed RF source information can be relatively transparent or opaque. An icon 74 is provided at the lower left of the screen, to select a video recording mode to record the view and overlaid RF source information, enabling recording of, for example, a sweeping view of the room to record all the observed sources, while icon 76 selects a 'snapshot' mode which takes a still picture of the video stream view with overlaid source information. Selecting icon 78 accesses options for recording control to provide the option to record the video stream. The recorded video stream or snapshots can be stored either locally, for example on mass storage device 58, or remotely, via network connection 56, for later playback or documentation purposes. Icon 80 provides access to setting controls to allow user configuration of operation of the device.

Video camera 48 is fixed focus in one embodiment, but has variable focus and zoom functions in other embodiments.

Figure 3:
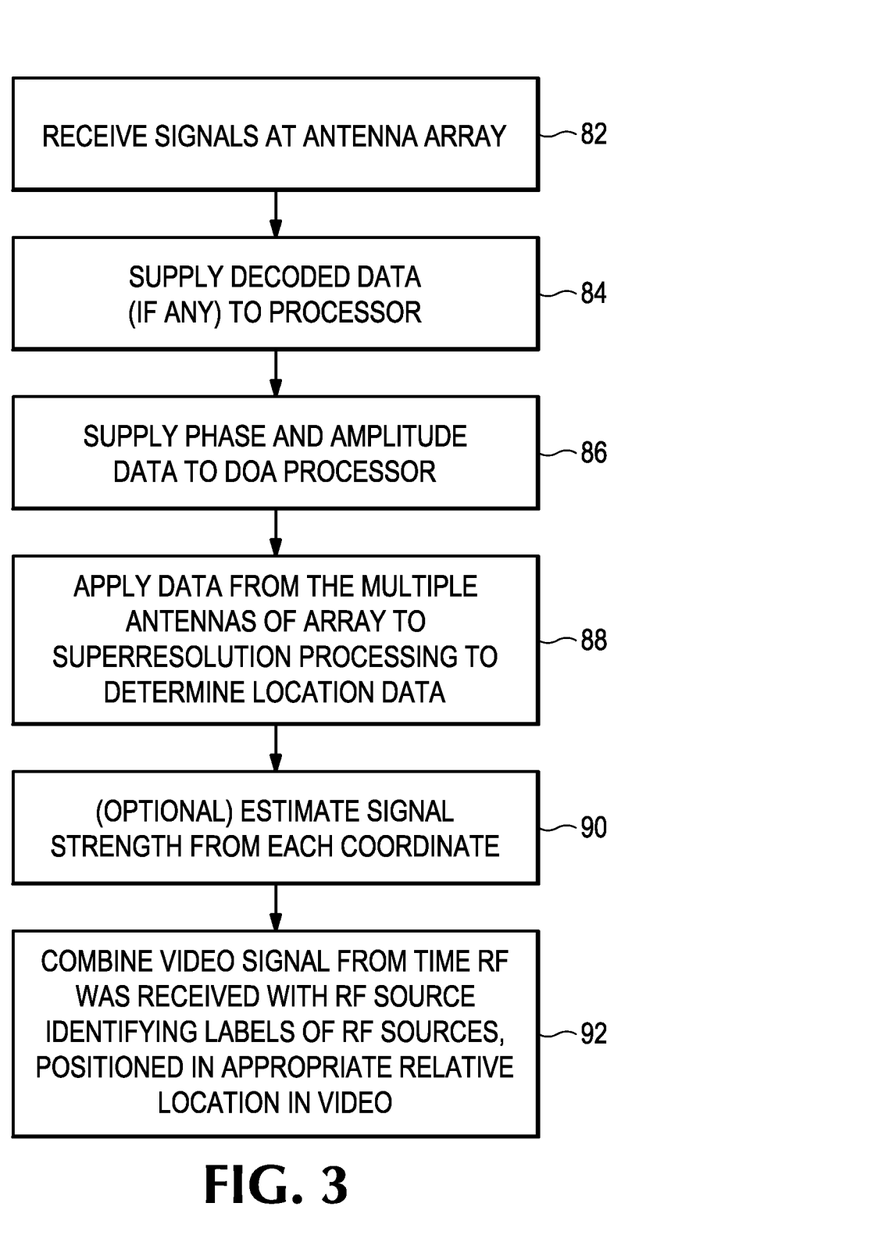
FIG. 3 is a flowchart of the operational steps performed by the device.

Referring again to FIGS. 1A and 1B together FIG. 3, a flow chart of the operational steps performed by the device, the function of the device is explained. The signals received at antennas 14, 16, 18, etc. are mixed down to a lower frequency in the corresponding receivers 20, 22, 24, etc., and then sampled by the A/D samplers. Typically all signals received during a typically 1 to 20 millisecond period are sampled, as an example. At this point, a digital processing step may optionally be applied and the data may be decoded, depending on the modulation, to extract any data carried on the signal. (Block 82) Alternatively, the time period employed can be other than 20 milliseconds, related to the amount of time for transmission/reception of a packet or other time slice or informational unit that would include identifying information to allow determination of transmission ID, in the case of signals having such data. The time to obtain identifying information may also be less than the entire data capture time, for example, where a longer reception time can be used to obtain additional location information. Also, the timing can be related to the video capture time to obtain an image of the scene in view. Of the decoded data, the portion that may be considered important for further use by the device may comprise, for example in the case of wireless local area network, the SSID of the transmitting device, or MAC id, IP address, subscriber identity information, unique subscriber identification, etc. In the case of a cellular phone signal this data may comprise a Mobile Identification Number (MIN), International Mobile Equipment Identity (IMEI), International Mobile Subscriber Identity (IMSI), etc. For Bluetooth, the information may comprise the device name, for example.

Each antenna, receiver, and processing system feeds the decoded data stream (block 84) to the general computing block 46 (illustrated as passing through the direction of arrival processing block 42, but the data need not be so supplied to the direction of arrival block and instead may be directly supplied to the general computing block). In addition, each receiver feeds (block 86) a stream of phase and amplitude samples representing the phase and amplitude of the RF signals received to the direction of arrival (DOA) processing block 42, which aggregates all the data from the antennas and feeds it into one of several existing 'superresolution' direction of arrival (DOA) algorithms. These algorithms take the aggregated array signals and produce a variable stream of data. This data stream contains a set of co-ordinates from which signals are arriving at the antenna array, suitably azimuth and elevation. (Block 88) An optional step (block 90) now feeds this stream back into the processing block to estimate signal strength from each coordinate.

Suitable superresolution processing steps are in an example embodiment as described in the publication Michael D. Zoltowski, Martin Haardt, and Cherian P. Mathews, "*Closed-Form 2D Angle Estimation with Rectangular Arrays in Element Space or Beamspace via Unitary Esprit,*" IEEE Trans. on Signal Processing, vol. 44, pp. 316-328, February 1996. The "Unitary ESPRIT" variant is used in a particular embodiment.

For an example of Unitary ESPRIT calculation steps using data collected from a 4×4 rectangular antenna array, start by forming a sparse unitary matrix $Q_M$. $Q_M$ is square with each dimension equal to the first dimension of the antenna array, namely 4:

$$Q_M = \frac{1}{\sqrt{2}} \begin{bmatrix} 1 & 0 & i & 0 \\ 0 & 1 & 0 & i \\ 0 & 1 & 0 & -i \\ 1 & 0 & -i & 0 \end{bmatrix} \quad \text{(Eqn 1)}$$

Another sparse unitary matrix $Q_N$ corresponds to the second dimension of the antenna array. Since the second dimension is also 4, $Q_N$ is the same as $Q_M$:

$$Q_N = \frac{1}{\sqrt{2}} \begin{bmatrix} 1 & 0 & i & 0 \\ 0 & 1 & 0 & i \\ 0 & 1 & 0 & -i \\ 1 & 0 & -i & 0 \end{bmatrix} \quad \text{(Eqn 2)}$$

A 16×16 unitary matrix $Q_{MN}$ is formed as the Kronecker matrix product of $Q_M$ and $Q_N$:

$$Q_{MN} = Q_M \otimes Q_N \quad \text{(Eqn 3)}$$

Measure the magnitude and phase at the 16 antennas simultaneously and assemble the complex measurements into a column vector $x_i$ of length 16. Each such column vector is called a "snapshot". Take a number P such snapshots as the duration of the RF signal permits. Assemble the column vector snapshots into a 16 by P array named X:

$$X = [x_1 \ldots x_i \ldots x_P] \quad \text{(Eqn 4)}$$

Form the sample covariance matrix of X which is $R_{XX}$:

$$R_{XX} = \frac{1}{P} X X^H \quad \text{(Eqn 5)}$$

where the superscript H denotes the conjugate transpose. Form the matrix product C:

$$C = Q_{MN} R_{XX} Q_{MN}^H \quad \text{(Eqn 6)}$$

Eigendecompose C, which finds the eigenvalues $\lambda$ and corresponding eigenvectors $v$ which solve the equation:

$$Cv = \lambda v \quad \text{(Eqn 7)}$$

Sort the eigenvalues by magnitude while maintaining their pairing with the eigenvectors. Choose the n largest eigenvalues according to some criterion such as n a fixed small number or by using a model order estimation scheme such as Akaike's Information Criterion (AIC). Assemble the surviving eigenvectors corresponding to the chosen eigenvalues as column vectors into matrix E.

$$E_S = [v_1 \ldots v_i \ldots v_n] \quad \text{(Eqn 8)}$$

Form 3×4 matrices $K_1$ and $K_2$:

$$K_1 = \frac{1}{2}\begin{bmatrix} 1 & 1 & 0 & 0 \\ 0 & \sqrt{2} & 0 & 0 \\ 0 & 0 & 1 & 1 \end{bmatrix} \quad \text{(Eqn 9)}$$

$$K_2 = \frac{1}{2}\begin{bmatrix} 0 & 0 & -1 & 1 \\ 0 & 0 & 0 & -\sqrt{2} \\ 1 & -1 & 0 & 0 \end{bmatrix} \quad \text{(Eqn 10)}$$

Form 12×16 matrices $K_{\mu 1}$, $K_{\mu 2}$, $K_{\nu 1}$ and $K_{\nu 2}$:

$$K_{\mu 1} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \otimes K_1 \quad \text{(Eqn 11)}$$

$$K_{\mu 2} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \otimes K_2 \quad \text{(Eqn 12)}$$

$$K_{\nu 1} = K_1 \otimes \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad \text{(Eqn 13)}$$

$$K_{\nu 2} = K_2 \otimes \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad \text{(Eqn 14)}$$

Find the matrices $\Psi_\mu$, $\Psi_\nu$ and D:

$$\Psi_\mu = [K_{\mu 1} E_S]^{-1} [K_{\mu 2} E_S] \quad \text{(Eqn 15)}$$

$$\Psi_\nu = [K_{\nu 1} E_S]^{-1} [K_{\nu 2} E_S] \quad \text{(Eqn 16)}$$

$$D = \Psi_\mu + i\Psi_\nu \quad \text{(Eqn 17)}$$

Compute the eigenvalues $\lambda_D$ of D. Then the angles measured to the x axis for the signals' direction of arrival are:

$$\theta_x = \cos^{-1}\left(\frac{2\tan^{-1}(\text{Re}(\lambda_D))}{k\Delta_x}\right) \quad \text{(Eqn 18)}$$

where k is the wavenumber and $\alpha_X$ is the antenna array's inter-element spacing in the x direction. Likewise the angles to the y axis are:

$$\theta_y = \cos^{-1}\left(\frac{2\tan^{-1}(\text{Im}(\lambda_D))}{k\Delta_y}\right) \quad \text{(Eqn 19)}$$

The video camera, aligned with the antenna array, is simultaneously producing a video stream. The general computing block 46 receives the video, the set of co-ordinates, and the optional decoded data stream, adding identifying markers or labels representing the RF source to the video stream in the locations determined by the DOA algorithms, employing the azimuth and elevation values obtained to locate the RF source in the display relative to the center line of the video camera's view. (block 92) The resulting video stream is sent to the display on the device, or across the network connection 56 to a remote location for remote display, whether in real time or recorded for later playback. The video stream may be recorded, either locally or remotely. Still image 'snapshots' may also be taken from the video stream and stored either locally or remotely. The recorded images may be printed.

The receivers are configured to receive particular bands of interest and may be provided in single frequency or band or multi-band configurations to locate one or more types of RF signals. Exemplary RF sources that may be located include, for example, IEEE 802.11 wireless local area network communications (currently 2.4, 3.6, 4.9 and 5 GHz frequency bands, 60 GHz), Bluetooth (2400-2480 MHz), cellular phone (currently 698-806 MHz, 806-849 MHz, 851-894 MHz, 1392-1395 MHz, 1432-1435 MHz, 1710-1755 MHz 2110-2155 MHz and 2496-2690 MHz), to name a few. Receivers tuned to receive emergency locator beacon frequencies, 2 way radio system frequencies (for example, public safety communication systems, private 2 way radio frequency bands . . . ), ZigBee and the like may also be employed.

The roll, pitch and yaw sensors 50 provide input to the general computing block 46 enabling the device to sense the direction and orientation it is pointing when data is being captured. As such, the displayed RF source locations can track with the movement of the device to follow the location on screen as the device is moved, since position information can be saved for each RF source. Other direction or motion sensing can be provided, such as compass bearings, accelerometer input, gyros, pixel motion processing (where movement is detected by observing pixel changes in the display).

Since in many environments, a single RF source is likely to produce many reflected signals at a location away from the source, the device may display multiple instances of a given source signal, representing each detected reflection.

In a further embodiment, detected RF sources are aggregated over time, so multiple devices transmitting at different times on the same channel can be displayed, with a label persisting on the display even though the source has stopped transmitting.

Indication can be provided to inform the operator that there are sources detected outside the current field of view on the video screen, which may be helpful when looking for a particular source or sources. This can comprise, for example, flashing icons or color bands or other suitable indication.

Yet another embodiment employs time-slicing across multiple frequencies, observing different frequencies during different time-slices, to provide a multiple band/service detector.

A different embodiment also includes GPS capability, so that the location of the device can be determined and recorded based on GPS. The GPS signal can be from an internal GPS receiver or received externally via the network connection 56 (or other optional interface).

Figure 4:
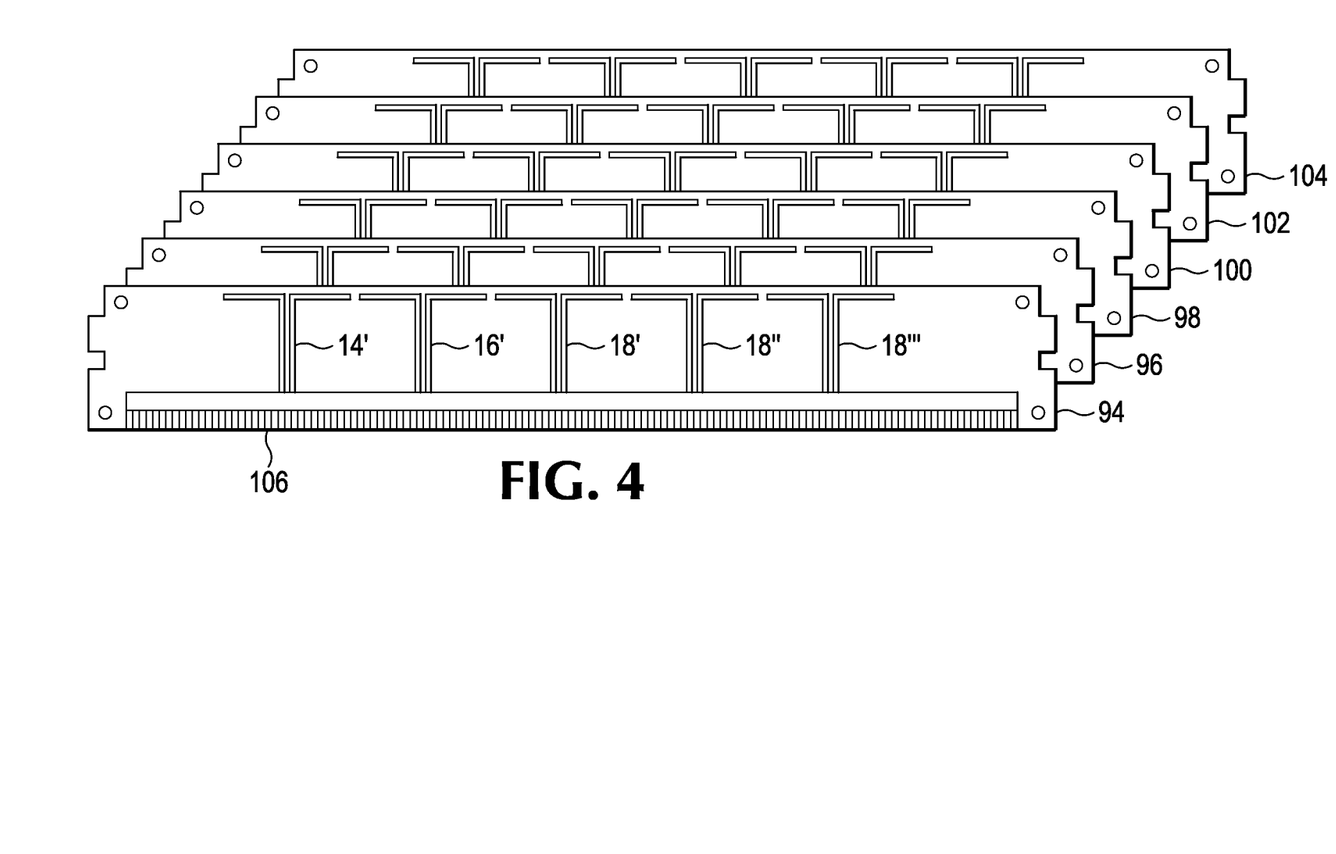
FIG. 4 is a view of an antenna array.

FIG. 4 is a view of an exemplary antenna array, in this case a 6 by 5 array. The plural antenna elements 14', 16', 18', 18" and 18''', etc., suitably dipole antennas in the illustrated embodiment, are formed in a linear arrangement on six planar substrates 94, 96, 98, 100, 102 and 104. The substrates may include respective interfaces 106 to allow physical and electrical connection of the antenna array to the device. In the illustrated embodiment the substrates can be plugged into interfaces that correspond to interfaces 106. Each antenna receives signals in use, and provides those signals to the antenna's respective receiver for detection and decoding.

Figure 5:
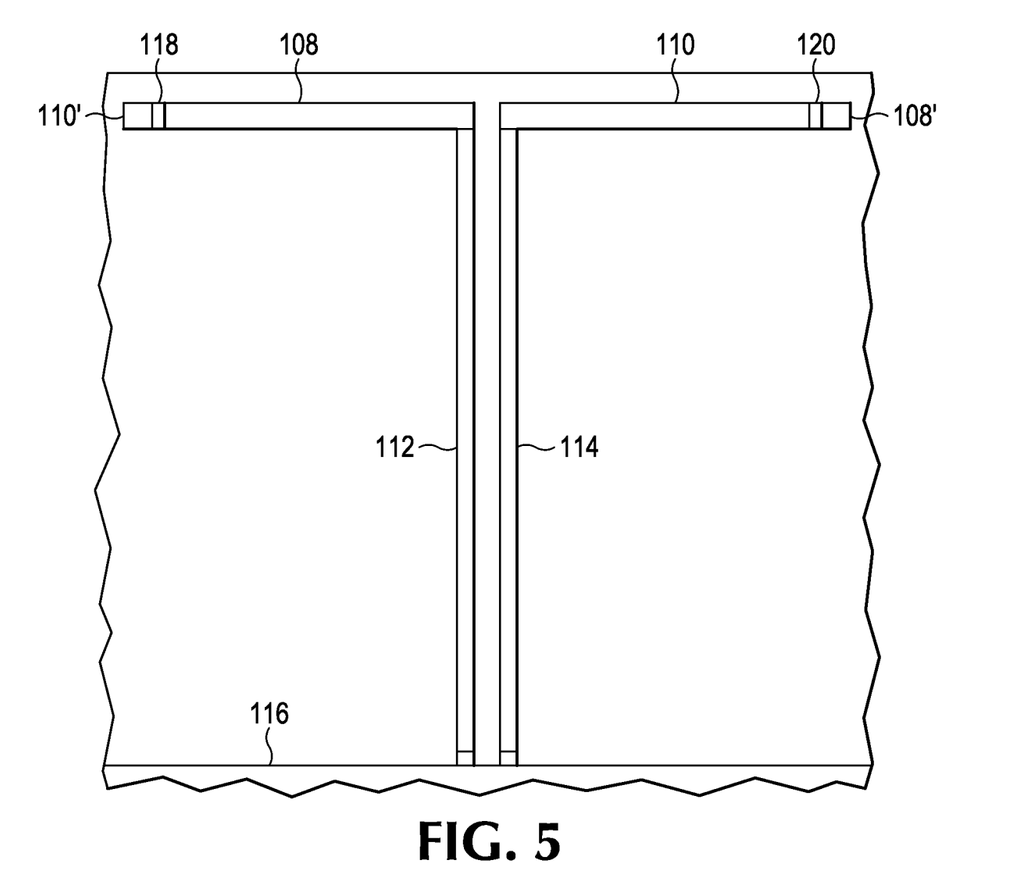
FIG. 5 is a view of an individual antenna.

Other array sizes can be employed, including but not limited to a 5×5 array, a 4×4 array a 3×3 array, a 5×4 array, a 4×3 array, and a 6×4 array An individual dipole antenna is illustrated in FIG. 5, wherein left and right conductors 108, 110 feed coplanar strips 112, 114. The antennas mount over ground plane 116, and coupling capacitors 118, 120 are provided at the ends of the conductors to couple to adjacent dipoles in the antenna array, left connector 108' of an adjacent dipole to the right and right connector 110' of an adjacent dipole to the left being illustrated.

The antenna array can suitably be provided in another embodiment as a detachable module that removably interfaces with the rest of the device, enabling different antenna arrays to be swapped in and used to provide different frequency band coverage.

Figure 6:
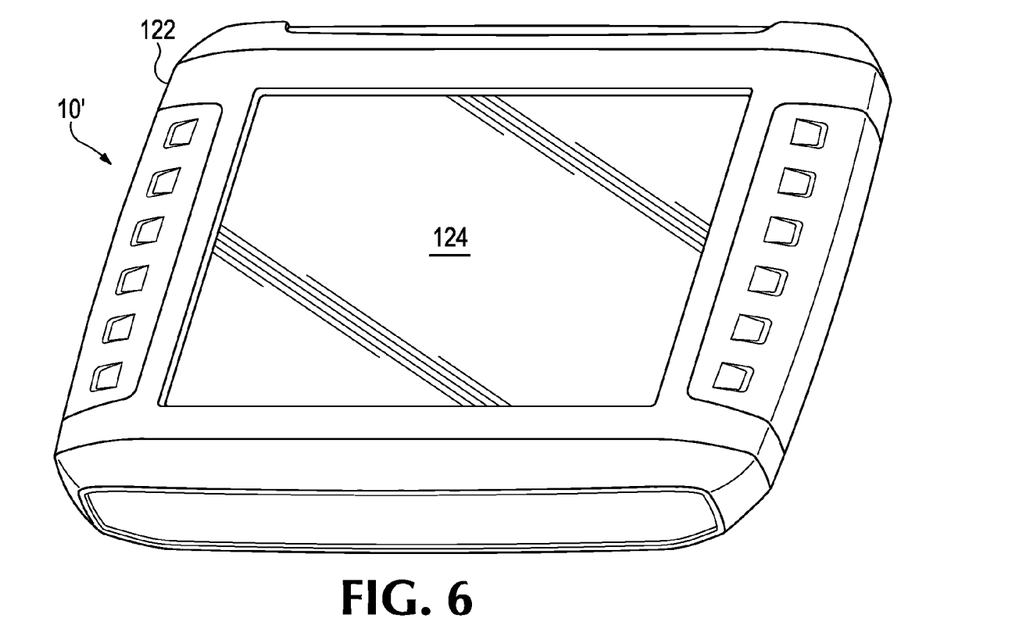
FIG. 6 is a screen side view of a hand held device.
Figure 7:
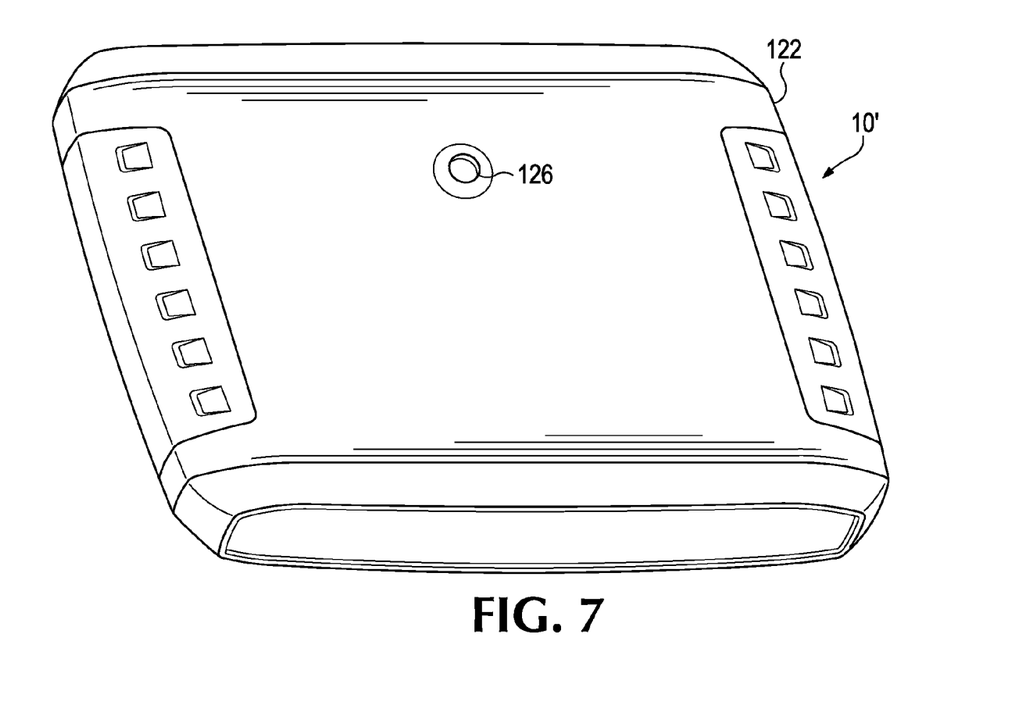
FIG. 7 is a camera side view of the hand held device.

Referring to FIGS. 6 and 7, front and rear views of an example hand held device 10', the antenna array is contained inside the case of the device 122, the case providing a suitable size to be gripped by a user's hand or hands, supporting a display screen 124. On the rear face of the device, camera lens 126 may be observed, providing visual input to camera 48.

To use the device, the operator grasps the case, points the camera a direction, and observes any RF source locations on the display. Moving the device to observe different parts of the scene provides information about RF sources as they come into view.

While the embodiment illustrated above employs a video camera, alternate versions are available. One such alternate does not employ any camera, and any location information is provided at a remote viewing screen, which could already include prior-stored scene information representative of the scene at the location of the device.

A further embodiment employs a still camera, for providing snap shot views of located RF sources, rather than video.

A still further embodiment, in place of a camera, has a transparent visual display screen whereby the operator can observe the scene by simply looking through the transparent screen while holding the device. Since the screen is transparent and any located RF sources are indicated on the screen, viewing through the screen provides the indication of the source and its location to the operator.

Yet another embodiment provides an IR camera/video system or night vision sensors, to enable use in low light conditions or nighttime use. A 3D camera may also be employed.

Display 54/124 can be a touch screen type display, the user interface for operation of the device thereby being implemented as a touch screen device.

A further feature provided in another embodiment is device filtering or filtered views, wherein the operator can specify certain types of RF sources or specific identification of RF sources of interest, and the general computing block 46 filters out RF sources not of interest and accordingly does not display the RF sources not meeting the filtering criteria. This can be particularly useful in situations where there is a large number of RF sources in a given location, allowing suppression of display of RF sources that might clutter the view or otherwise mask the sources of interest. Or, particular sources of interest meeting the filter criteria can be highlighted or flashed or otherwise made to stand out from other source labels on the display.

The device can be provided with an omnidirectional wireless local area network (or other technology) sensor to detect and identify RF source identification information which can be saved to be used in conjunction with the directional information.

An audio indicator is provided in another embodiment, to, for example, announce when particular sources of interest are located if looking for a specific identifier or if filter conditions are met (or not met), or to provide other audio feedback.

While the embodiments illustrated hereinabove relate to locating RF transmission sources that represent transmitting stations or the like, the device may also be useful for locating RF noise sources. For example, a filter can be set up to not display any sources that include data transmission, or sources that represent a certain type of signal behavior exemplifying noise sources.

The illustrated embodiment of FIGS. 1A and 1B shows a decoder 32 on each receiver, but an alternate version does not require a decoder associated with each receiver. At a minimum, one decoder is provided in the device so that at least one antenna's incoming signal is decoded to extract the information contained in the RF signal.

Multiple devices can be used in conjunction with one another, with communication between units to coordinate and share data. This communication can be accomplished with the addition of wireless communication modules for the device, or via the network interface 56.

While the embodiment illustrated in FIGS. 6 and 7 employs an antenna array that is contained inside the case of the device, another embodiment provides a detachable antenna array, which can be provided as a module that mounts to the back of the device with suitable connection to communicate the signals from the antenna, or a separately held or mounted antenna array that is attached by cable or wireless communication to the processing unit.

Accordingly, the device is adapted to locate an RF source within a view frame. The device provides a full scene view of RF sources with a single 'snapshot' view, without having to move the device during data capture. Located sources can be remembered along with the direction of each source in the field of view.

The described device can be either portable or fixed mount, and is applicable to a wide variety of RF signals. Typically the device is provided with a battery as power source, although AC mains can also provide the power.

The device is suitably provided in different embodiments for receiving 802.11 standard (wireless local area network) signals, cellular phone signals, emergency locator beacons, Bluetooth, or any other particular frequency bands of interest, providing fast location of transmitting devices and further assisting in understanding the way that signals propagate into, out of, or through a location.

In summary, the device locates short (or long) and/or infrequent RF sources, over one or more frequency ranges, and provides an augmented reality display showing the location of the RF sources on the observed scene, further identifying those transmissions that have some identifier information included with the transmission.

In addition to locating active RF transmission sources, the device is suitably useful to pinpoint the location of RF noise sources.

While plural embodiments of the technology have been shown and described, it will be apparent to those skilled in the art that many changes and modifications may be made without departing from the broader aspects. The appended claims are therefore intended to cover all such changes and modifications as fall within the true spirit and scope of the technology.

The invention claimed is:

1. An instrument for detecting a direction to a source of RF energy relative to the instrument and indicating the direction to a user, comprising:

an antenna;

a receiver coupled to the antenna generating a signal indicative of received RF energy from the source of RF energy;

an imager for gathering image data from a scene of physical objects and producing a signal indicative thereof;

a processor receiving the signal indicative of received RF energy, determining the direction to the RF source based on the signal for a predetermined period of time representative of a time related to the produced image data signal, and combining the direction of received RF energy with image data received from the imager representative of the predetermined period of time;

a sensor for determining roll, pitch, and yaw coordinates of the instrument; and a display coupled to the processor for displaying a direction parameter indicative of the RF direction and the determined roll, pitch, and yaw coordinates with respect to the image of the scene corresponding to the predetermined period of time.

2. The instrument according to claim 1, wherein the antenna comprises plural antenna elements, each receiving RF energy, to form an antenna array.

3. The instrument according to claim 2, wherein the antenna array comprises antenna elements in positions offset from one another.

4. The instrument according to claim 3, wherein the antenna elements are tuned to RF energy at a frequency of approximately 2.4 GHz.

5. The instrument according to claim 3, wherein the antenna elements are tuned to RF energy at a frequency of approximately 5 GHz.

6. The instrument according to claim 3, wherein the antenna elements are tuned to RF energy at a frequency range of approximately 2.4 GHz to 5 GHz or 60 GHz.

7. The instrument according to claim 3, wherein the antenna elements are tuned to one or more frequencies selected from the group consisting of 698806 MHz, 806-89 MHz, 851-894 MHz, 1392-1395 MHz, 1432-1435 MHz, 1710-1755 MHz 2110-2155 MHz and 2496-26906 MHz.

8. The instrument according to claim 2, wherein the receiver comprises a plurality of channels, one for each antenna element, coupled to receive signals from respective antenna elements.

9. The instrument according to claim 1, wherein the imager comprises a camera.

10. The instrument according to claim 9, wherein the camera is selected from the group consisting of a visible image camera, or an infrared imager.

11. The instrument according to claim 9, wherein the camera is a video camera.

12. The instrument according to claim 1, wherein the direction parameter indicative of the RF direction is overlaid on the image of the scene corresponding to the predetermined period of time.

13. The instrument according to claim 1, wherein the processor synchronizes the processing of the signals indicative of RF energy from the receiver channels.

14. The instrument according to claim 1, wherein the processor synchronizes the processing of signals indicative of the direction of received RF energy with the processing of signals indicative of the image data received from the imager.

15. The instrument according to claim 1, wherein the processor comprises a decoder configured to identify the RF source.

16. The instrument according to claim 15, wherein the display further displays an identification parameter indicative of the identity of the RF source.

17. The instrument according to claim 1, wherein the predetermined time corresponds to timing of identifier information for the RF source.

18. The instrument according to claim 1, wherein the predetermined time corresponds to timing for displaying a video image frame of the image data.

19. The instrument according to claim 1, wherein the instrument is handheld.

20. The instrument according to claim 19, further comprising motion sensing.

* * * * *

UNITED STATES PATENT AND TRADEMARK OFFICE
CERTIFICATE OF CORRECTION

| | | |
|---|---|---|
| PATENT NO. | : 9,291,695 B2 | Page 1 of 1 |
| APPLICATION NO. | : 13/717250 | |
| DATED | : March 22, 2016 | |
| INVENTOR(S) | : Peter Q. Oakley et al. | |

It is certified that error appears in the above-identified patent and that said Letters Patent is hereby corrected as shown below:

Claims

At column 9, claim number 7, line number 38, change "806-89" to --806-849--; and At column 9, claim number 7, line number 40, change "2496-26906" to --2496-2690--.

Signed and Sealed this
Seventeenth Day of May, 2016

Michelle K. Lee
*Director of the United States Patent and Trademark Office*